US008798459B2

(12) United States Patent
Furukawa et al.

(10) Patent No.: US 8,798,459 B2
(45) Date of Patent: Aug. 5, 2014

(54) OPTICAL RECEIVER AND METHOD OF DETECTING LOSS OF OPTICAL SIGNAL OF THE OPTICAL RECEIVER

(75) Inventors: Masaaki Furukawa, Yokohama (JP); Kouhei Sagara, Yokohama (JP)

(73) Assignee: Oclaro Japan, Inc., Kanagawa (JP)

( * ) Notice: Subject to any disclaimer, the term of this patent is extended or adjusted under 35 U.S.C. 154(b) by 803 days.

(21) Appl. No.: 12/477,153

(22) Filed: Jun. 3, 2009

(65) Prior Publication Data

US 2009/0304396 A1 Dec. 10, 2009

(30) Foreign Application Priority Data

Jun. 4, 2008 (JP) ................................. 2008-146589

(51) Int. Cl.
*H04B 10/08* (2011.01)
*H04B 17/00* (2006.01)

(52) U.S. Cl.
USPC .................. 398/24; 398/17; 398/25; 398/26; 398/38

(58) Field of Classification Search
None
See application file for complete search history.

(56) References Cited

U.S. PATENT DOCUMENTS

| 4,551,691 A * | 11/1985 | Ogawa .......................... 331/111 |
| 2001/0033188 A1* | 10/2001 | Aung et al. ................... 327/141 |
| 2006/0159460 A1* | 7/2006 | Stewart et al. ................ 398/135 |
| 2007/0280684 A1* | 12/2007 | Onoda et al. .................... 398/38 |

FOREIGN PATENT DOCUMENTS

| CN | 1632597 A | 6/2005 |
| JP | 07-046203 | 2/1995 |

OTHER PUBLICATIONS

Chinese Office Action dated Nov. 3, 2011 for Application No. 200910141354.7.

* cited by examiner

*Primary Examiner* — Darren E Wolf
(74) *Attorney, Agent, or Firm* — Antonelli, Terry, Stout & Kraus, LLP.

(57) ABSTRACT

The optical receiver includes: a photoelectric conversion circuit for receiving an optical signal and converting the received optical signal into an electrical signal; a comparator for outputting a first determination signal (S1) when a voltage corresponding to the optical signal does not reach a first threshold value (TH1) and for canceling an output of the S1 when the voltage corresponding to the optical signal exceeds a second threshold value larger than TH1 during the S1 is output; a timing extraction circuit for generating a clock signal based on a frequency and a phase of the electrical signal obtained by the converting and for outputting a second determination signal (S2) when the generated clock signal does not satisfy a predetermined condition; a unit for causing the comparator to output the S1 when the S2 is output; and detects loss of optical signal while one of the S1 and S2 is output.

1 Claim, 6 Drawing Sheets

Conventional Art

FIG.6A

Conventional Art

OPTICAL RECEIVER AND METHOD OF DETECTING LOSS OF OPTICAL SIGNAL OF THE OPTICAL RECEIVER

CROSS-REFERENCE TO RELATED APPLICATION

The present application claims priority from Japanese application JP 2008-146589 filed on Jun. 4, 2008, the content of which is hereby incorporated by reference into this application.

BACKGROUND OF THE INVENTION

1. Field of the Invention

The present invention relates to an optical receiver and a method of detecting loss of optical signal of the optical receiver.

2. Description of the Related Art

In an optical receiver for receiving an optical signal transmitted in an optical transmission system, when the received optical signal is lowered in level or is lost, detection of loss of optical signal is performed for detecting such a state. It is very important to perform the detection of loss of optical signal with high precision in order to improve the reliability of data transmission. A conventional technology for performing the detection of loss of optical signal in the optical receiver is, for example, a technology described in JP 07-046203A. JP 07-046203 A discloses a method of generating an alarm for detecting loss of optical signal when the optical signal input to the optical receiver is lost in the optical transmission system.

Figure 5:
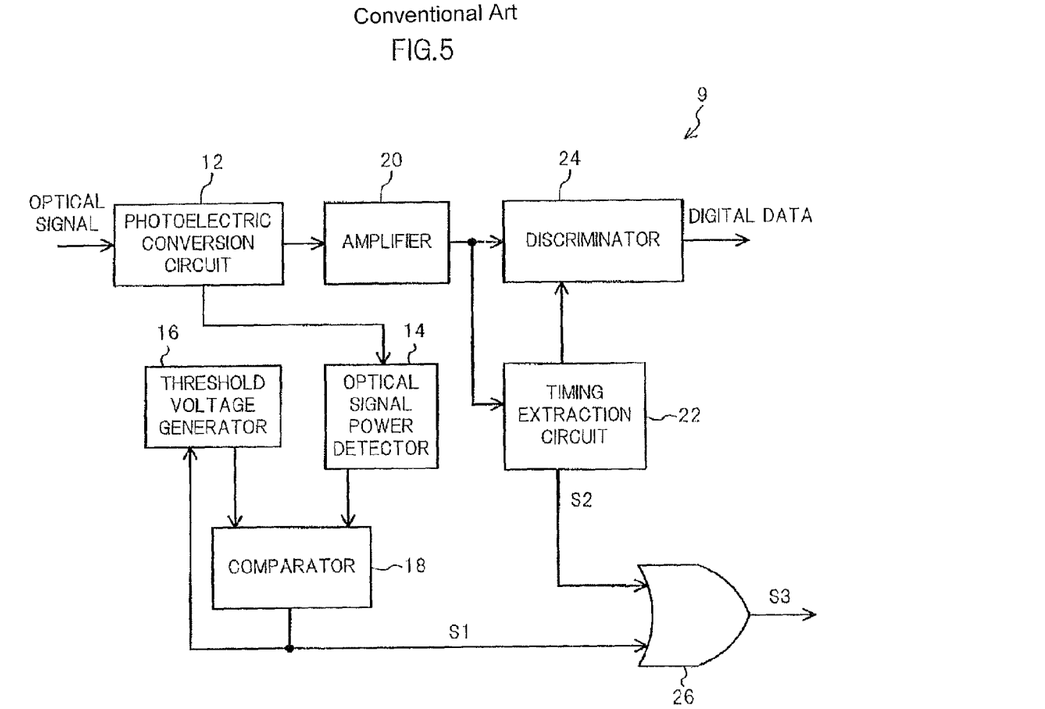
FIG. 5 is a structural diagram illustrating a conventional optical receiver.
Figure 6A:
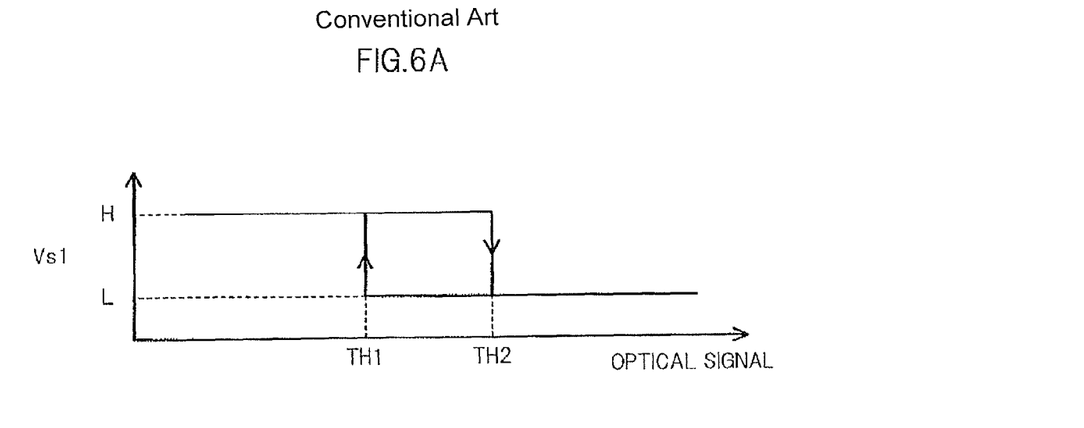
FIG. 6A is an explanatory diagram illustrating a characteristic of a first determination signal.

FIG. 5 illustrates a structure of an optical receiver 9 according to the conventional technology. In the optical receiver 9 illustrated in FIG. 5, an optical signal transmitted through an optical transmission path is converted into an electrical signal by a photo electric conversion circuit 12. Upon receiving the optical signal, an optical signal power detector 14 detects a voltage corresponding to an optical current generated in the photoelectric conversion circuit 12. A comparator 18 compares the detected voltage with a threshold voltage set by a threshold voltage generator 16. When a voltage level of the optical signal is low, a first determination signal (S1) is output. The threshold voltage generator 16 sets two different threshold values to the comparator 18 to provide a hysteresis characteristic as illustrated in FIG. 6A in order to determine the voltage level of the optical signal. That is, the voltage level of the optical signal is initially compared with a first threshold value (TH1). When the voltage level becomes smaller than the first threshold value, the first determination signal (S1) is output. Once the first determination signal becomes an output state, a second threshold value (TH2) larger than the first threshold value is set by the threshold voltage generator 16 so that the output of the first determination signal is not cancelled before the voltage level becomes larger than the second threshold value TH2. In FIG. 6A, Vs1 indicates a voltage of the first determination signal.

The electrical signal obtained by conversion by the photoelectric conversion circuit 12 is amplified by an amplifier 20. A timing extraction circuit 22 generates a clock signal based on an output of a phase locked loop (PLL), which is synchronized with a frequency component of the amplified electrical signal. A discriminator 24 obtains digital data (received data) from the amplified electrical signal based on the clock signal generated by the timing extraction circuit 22.

Figure 6B:
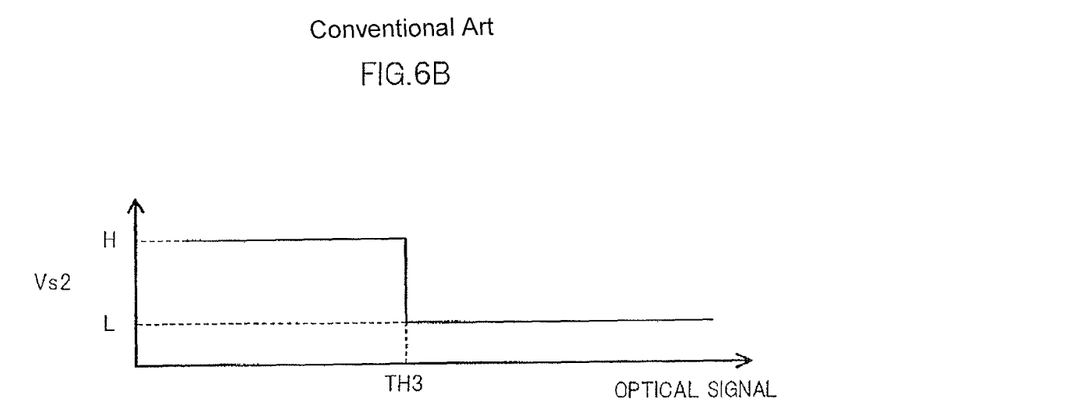
FIG. 6B is an explanatory diagram illustrating a characteristic of a second determination signal.
Figure 7A:
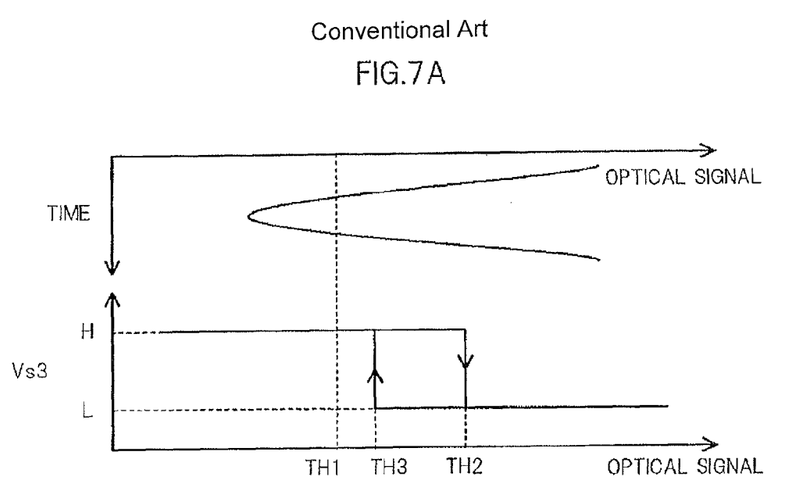
FIG. 7A is an explanatory diagram illustrating a relationship between an optical signal pattern and a signal of detection of loss of optical signal.

As illustrated in FIG. 6B, when an amplitude voltage of the generated clock signal is smaller than a reference threshold value (TH3), the timing extraction circuit 22 outputs the second determination signal (S2). In FIG. 6B, Vs2 indicates a voltage of the second determination signal. The first determination signal and the second determination signal are input to an optical signal loss detector 26 (OR circuit). When one of the first and second determination signals is output, an optical signal loss state is determined and thus a signal of detection of loss of optical signal (S3) is output. In the optical receiver 9 operating as described above, when an optical signal having a pattern as illustrated in an upper part of FIG. 7A is received, the signal of detection of loss of optical signal (S3) has a hysteresis characteristic as illustrated in a lower part of FIG. 7A. In FIG. 7A, Vs3 indicates a voltage of the signal of detection of loss of optical signal.

Figure 7B:
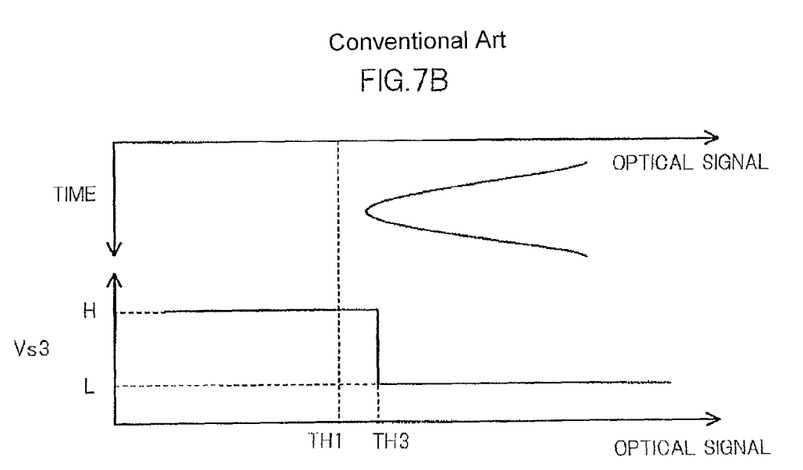
FIG. 7B is another explanatory diagram illustrating the relationship between the optical signal pattern and the signal of detection of loss of optical signal.

According to the conventional technology described above, there is a case where the hysteresis characteristic of the signal of detection of loss of optical signal is not effectively exhibited based on the first determination signal depending on the pattern of the received optical signal. That is, when an optical signal having a pattern as illustrated in an upper part of FIG. 7B is received with respect to each of the threshold value of the first determination signal and the threshold value of the second determination signal in the optical receiver 9, the second determination signal is output, and hence the detection of loss of optical signal is temporarily performed. However, the first determination signal is not output. Therefore, even when the detection of loss of optical signal is performed, the output characteristic of the detection of loss of optical signal as illustrated in a lower part of FIG. 7B is obtained. Thus, according to the conventional optical receiver 9, there is the case where the hysteresis characteristic of the detection of loss of optical signal is not effectively exhibited based on the first determination signal. As a result, there is a case where the detection of loss of optical signal is not performed even when the quality of the received optical signal is not sufficiently stable.

SUMMARY OF THE INVENTION

The present invention has been made in view of the problem described above. An object of the present invention is to provide an optical receiver capable of detecting loss of optical signal with high precision, and a method of detecting loss of optical signal of the optical receiver.

In order to achieve the object described above, an optical receiver according to one aspect of the present invention includes: means for receiving an optical signal; means for converting the optical signal received by the receiving means into an electrical signal; first determination signal outputting means for outputting a first determination signal when a voltage corresponding to the optical signal is smaller than a first threshold value; first determination signal canceling means for canceling an output of the first determination signal when the voltage corresponding to the optical signal exceeds a second threshold value larger than the first threshold value during the output of the first determination signal; second determination signal outputting means for generating a clock signal based on a frequency and a phase of the electrical signal obtained by the converting and for outputting a second determination signal when the generated clock signal does not satisfy a predetermined condition; means for causing the first determination signal outputting means to output the first determination signal when the second determination signal is generated by the second determination signal outputting means; and optical signal loss detecting means for detecting loss of optical signal while one of the first determination signal and the second determination signal is output.

According to another aspect of the present invention, the means for causing the first determination signal outputting means to output the first determination signal temporarily adjusts the first threshold value to a value larger than a current value.

According to another aspect of the present invention, the second determination signal outputting means outputs the second determination signal when an amplitude voltage of the clock signal is smaller than a reference threshold value.

According to another aspect of the present invention, the first determination signal outputting means outputs the first determination signal when a voltage of a signal obtained by amplifying the electrical signal obtained by the converting is smaller than the first threshold value, and the first determination signal canceling means cancels the output of the first determination signal when the voltage of the signal obtained by amplifying the electrical signal obtained by the converting exceeds the second threshold value larger than the first threshold value.

A method of detecting loss of optical signal of an optical receiver according to one aspect of the present invention includes: a receiving step of receiving an optical signal; a step of converting the received optical signal into an electrical signal; a first determination signal outputting step of causing a first determination signal outputting means to output a first determination signal when a voltage corresponding to the optical signal is smaller than a first threshold value; a first determination signal canceling step of causing a first determination signal canceling means to cancel an output of the first determination signal when the voltage corresponding to the optical signal exceeds a second threshold value larger than the first threshold value during the output of the first determination signal; a second determination signal outputting step of causing a second determination signal outputting means to generate a clock signal based on a frequency and a phase of the electrical signal obtained by the converting and to output a second determination signal when the generated clock signal does not satisfy a predetermined condition; a step of causing the first determination signal outputting means to output the first determination signal when the second determination signal is generated in the second determination signal outputting step; and a step of detecting loss of optical signal for detecting loss of optical signal while one of the first determination signal and the second determination signal is output.

According to one aspect of the present invention, once the detection of loss of optical signal is performed, the first determination signal is set to an output state. Therefore, a hysteresis characteristic of detection of loss of optical signal is effectively exhibited based on the first determination signal. Thus, the optical signal loss can be detected with high precision.

According to one aspect of the present invention, when the second determination signal is output, the first threshold value is temporarily increased, whereby the first determination signal can be output. Therefore, the hysteresis characteristic of the detection of loss of optical signal is effectively exhibited based on the first determination signal.

According to one aspect of the present invention, when the clock signal is not normal, the optical signal loss can be detected.

According to one aspect of the present invention, the output of the first determination signal and the canceling of the output thereof are performed based on the amplified electrical signal, whereby a threshold value scale to be set can be adjusted.

DETAILED DESCRIPTION OF THE INVENTION

Hereinafter, a preferred embodiment for embodying of the present invention (hereinafter referred to as embodiment) is described with reference to the attached drawings.

Figure 1:
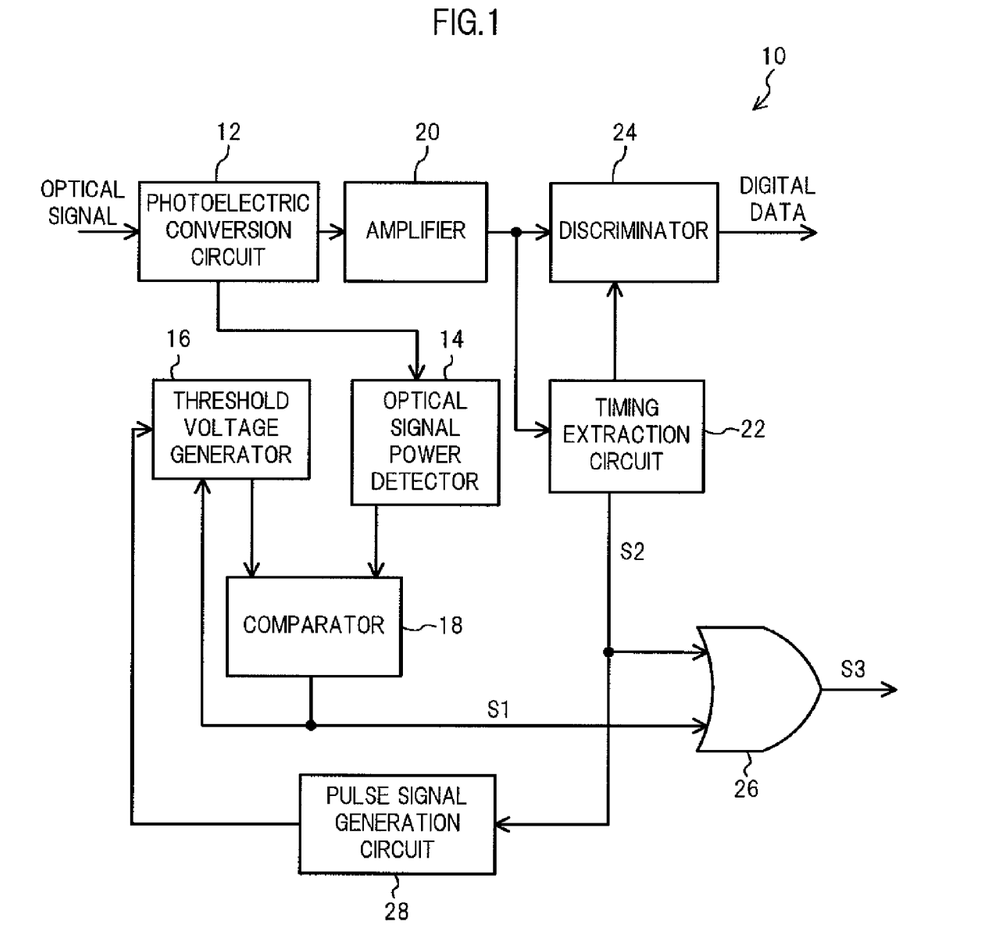
FIG. 1 is a structural diagram illustrating an optical receiver according to an embodiment of the present invention.

FIG. 1 is a system structural diagram illustrating an optical receiver 10 according to this embodiment. As illustrated in FIG. 1, the optical receiver 10 includes a photoelectric conversion circuit 12, an optical signal power detector 14, a threshold voltage generator 16, a comparator 18, an amplifier 20, a timing extraction circuit 22, a discriminator 24, an optical signal loss detector 26, and a pulse signal generation circuit 28.

The photoelectric conversion circuit 12 is a circuit which includes a light receiving element for receiving an optical signal and converts the received optical signal into an electrical signal.

The optical signal power detector 14 detects a voltage value corresponding to an optical current flowing through the photoelectric conversion circuit 12 by the received optical signal.

The threshold voltage generator 16 is a circuit which generates a threshold voltage (reference voltage) to be compared with the voltage value corresponding to the optical signal, which is detected by the optical signal power detector 14.

The comparator 18 compares the voltage detected by the optical signal power detector 14 with the threshold voltage generated by the threshold voltage generator 16 and outputs a first determination signal based on a result obtained by comparison. The first determination signal is a signal indicating that the input optical signal is lowered in level. A first threshold voltage (TH1) and a second threshold voltage (TH2) are set to the comparator 18. When a voltage of the received optical signal becomes smaller than the first threshold voltage, the first determination signal is output. The first determination signal is continuously output until the voltage of the received optical signal becomes larger than the second threshold voltage. That is, when the voltage of the optical signal becomes larger than the second threshold voltage, an output state of the first determination signal is cancelled.

Figure 2:
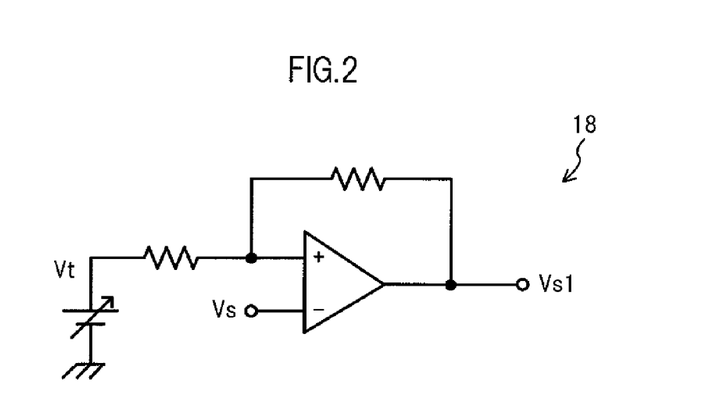
FIG. 2 illustrates an example of a structure of a comparator.

FIG. 2 illustrates a structural example of the comparator 18. As illustrated in FIG. 2, a voltage Vs of the optical signal and a threshold voltage Vt are input to the comparator 18.

When Vs is smaller than Vt, a signal of "high (H)" level is output (Vs1). When Vs is equal to or larger than Vt, a signal of "low (L)" level is output (Vs1). The threshold voltage Vt is a variable voltage. Assume that a state in which the signal of "H" level is being output is a state in which the first determination signal is being output. In this case, the threshold voltage Vt while the first determination signal is not output is set to TH1, the threshold voltage Vt while the first determination signal is output is set to TH2, and a relationship therebetween is expressed by TH1<TH2.

The amplifier 20 is a circuit which amplifies the electrical signal obtained by conversion by the photoelectric conversion circuit 12.

The timing extraction circuit 22 is a circuit which generates a clock signal based on a frequency and a phase of the electrical signal amplified by the amplifier 20 and outputs the generated clock signal to the discriminator 24. When the generated clock signal does not satisfy a predetermined condition, for example, when an amplitude voltage of the clock signal does not reach a reference threshold value (TH3), the timing extraction circuit 22 outputs the second determination signal. The second determination signal is a determination signal indicating that the generated clock signal is not in an adequate state.

The discriminator 24 is a circuit which punches the electrical signal amplified by the amplifier 20 through the clock signal input from the timing extraction circuit 22, to obtain encoded digital data of the electrical signal.

When one of the first determination signal output from the comparator 18 and the second determination signal output from the timing extraction circuit 22 is being output, the optical signal loss detector 26 outputs a signal of detection of loss of optical signal indicating an optical signal loss state. The optical signal loss detector 26 includes an OR (logic OR) circuit to which the first determination signal and the second determination signal are input.

The pulse signal generation circuit 28 is a circuit which receives the second determination signal output from the timing extraction circuit 22 and generates a pulse signal based on the received second determination signal. The pulse signal generated by the pulse signal generation circuit 28 is input to the threshold voltage generator 16.

Upon receiving the pulse signal from the pulse signal generation circuit 28, the threshold voltage generator 16 may temporarily adjust the first threshold voltage to a voltage value higher than the first threshold voltage. Therefore, the state in which the first determination signal is output from the comparator 18 is obtained.

Figure 3:
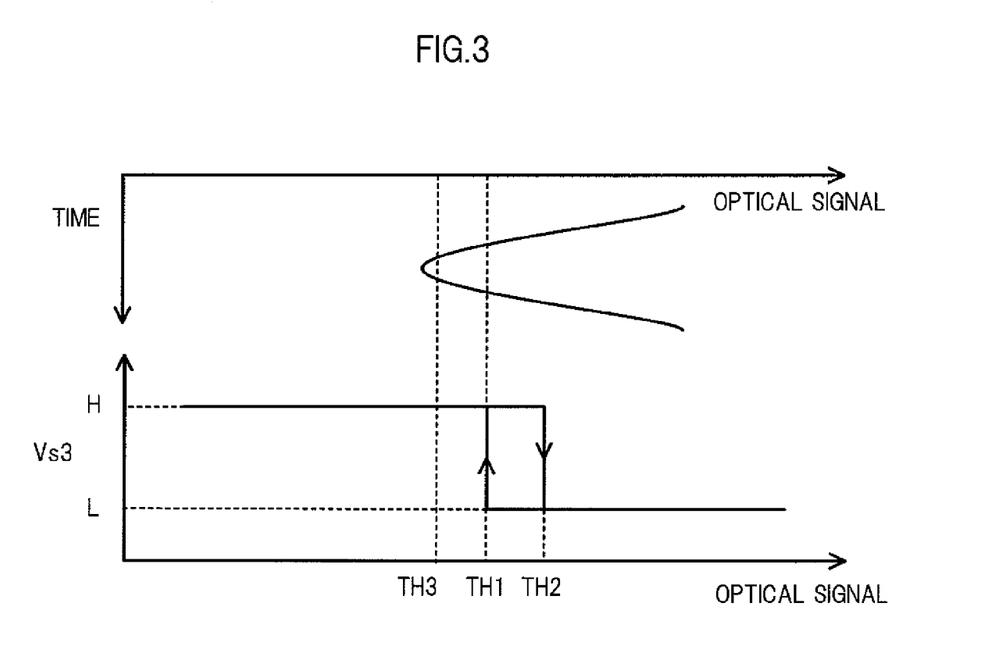
FIG. 3 is an explanatory diagram illustrating an effect of the optical receiver according to the embodiment of the present invention.

An effect obtained by temporarily adjusting the first threshold voltage by the pulse signal generation circuit 28 is described with reference to FIG. 3. FIG. 3 illustrates a characteristic of the signal of detection of loss of optical signal in a case where the optical receiver 10 receives an optical signal having the same pattern as illustrated in FIG. 7B. In the optical receiver 10, when the second determination signal is output, the first threshold voltage (TH1) is temporarily adjusted to a larger value. Therefore, the first determination signal forcedly becomes an output state to provide the signal of detection of loss of optical signal with a hysteresis characteristic. After the first determination signal forcedly becomes the output state, the threshold voltage generator 16 may return the first threshold voltage (TH1) to the original value.

Figure 4:
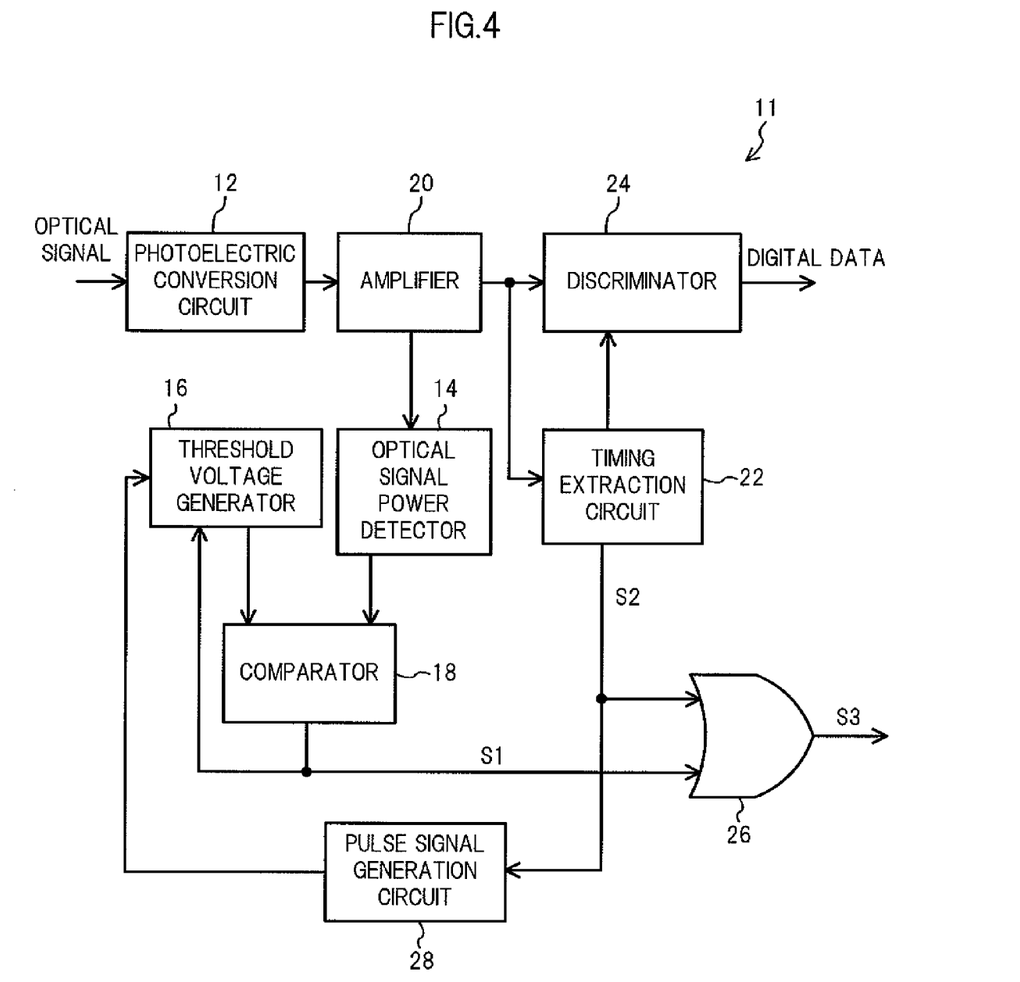
FIG. 4 is a structural diagram illustrating a modified example of the optical receiver according to the embodiment of the present invention.

FIG. 4 illustrates a modified example of the embodiment described above. Unlike the embodiment described above, according to an optical receiver 11 illustrated in FIG. 4, the voltage corresponding to the optical current flowing through the photoelectric conversion circuit 12 by the received optical signal is detected based on the electrical signal amplified by the amplifier 20. Other structures are the same as in the embodiment described above.

The present invention is not limited to the embodiment described above. For example, the comparator 18 may be configured as an analog or digital circuit which holds state values for discriminating whether or not the first determination signal is output. In this case, when it is detected that the second determination signal is output, the pulse signal from the pulse signal generation circuit 28 may be input to the comparator 18 so as to force a state value held in the comparator 18 into a state value for exhibiting the state in which the first determination signal is output. In each case of comparison between various signals and threshold values which are used in the embodiment described above, whether or not a boundary value thereof is included is not limited to the example described above. The present invention is not limited to the optical receiver and can be similarly applied to an optical transmitting and receiving device.

While there have been described what are at present considered to be certain embodiments of the invention, it is understood that various modifications may be made thereto, and it is intended that the appended claims cover all such modifications as fall within the true spirit and scope of the invention.

What is claimed is:

1. An optical receiver, comprising:
a photoelectric conversion circuit configured to receive an optical signal, and to convert the received optical signal into an electrical signal;
a comparator configured to output a first determination signal when a voltage corresponding to the optical signal is smaller than a first threshold value, and configured to cancel an output of the first determination signal when the voltage corresponding to the optical signal exceeds a second threshold value larger than the first threshold value during the output of the first determination signal;
a timing extraction circuit configured to generate a clock signal based on a frequency and a phase of the electrical signal obtained from the photoelectric circuit, and configured to output a second determination signal to a discriminator when the generated clock signal does not satisfy a predetermined condition;
a threshold voltage generator configured to cause the comparator to output the first determination signal when the second determination signal is generated by the timing extraction circuit;
an optical signal loss detector configured to detect loss of optical signal when one of the first determination signal and the second determination signal is output;
an optical signal power detector, configured to detect a voltage corresponding to an optical current generated in the photoelectric conversion circuit, and to transmit the voltage corresponding to the optical signal to the comparator;
an amplifier configured to amplify the electrical signal obtained by conversion of the photoelectric conversion circuit, and configured to transmit the amplified electrical signal to the discriminator and to the timing extraction circuit;
the discriminator, configured to obtain encoded digital data from the amplified electrical signal, based on the clock signal generated by the timing extraction circuit;
a pulse signal generation circuit configured to receive the second determination signal output from the timing extraction circuit, and to generate a pulse signal based on the received second determination signal, the generated pulse signal being transmitted to the threshold voltage generator;

wherein the timing extraction circuit is further configured to transfer the generated clock signal to the pulse signal generation circuit.

* * * * *